US010356256B2

(12) United States Patent
Yamauchi

(10) Patent No.: US 10,356,256 B2
(45) Date of Patent: Jul. 16, 2019

(54) COMMUNICATION APPARATUS, CONTROL METHOD FOR COMMUNICATION APPARATUS, AND STORAGE MEDIUM FOR CHANGING A VERSION OF AN ENCRYPTION COMMUNICATION PROTOCOL USED FOR COMMUNICATION

(71) Applicant: CANON KABUSHIKI KAISHA, Tokyo (JP)

(72) Inventor: Hisayuki Yamauchi, Abiko (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/716,336

(22) Filed: Sep. 26, 2017

(65) Prior Publication Data

US 2018/0103161 A1 Apr. 12, 2018

(30) Foreign Application Priority Data

Oct. 7, 2016 (JP) ................................. 2016-198894

(51) Int. Cl.
G06F 3/12 (2006.01)
H04N 1/00 (2006.01)
G06F 21/60 (2013.01)
H04N 1/44 (2006.01)

(52) U.S. Cl.
CPC ....... *H04N 1/00411* (2013.01); *G06F 21/602* (2013.01); *G06F 21/606* (2013.01); *G06F 21/608* (2013.01); *H04N 1/44* (2013.01); H04N 2201/0082 (2013.01)

(58) Field of Classification Search
CPC ................ H04N 1/00411; H04N 1/44; H04N 2201/0082; G06F 21/602; G06F 21/606; G06F 21/608; H04L 63/0823; H04L 63/166; H04L 63/20; H04L 67/08; H04L 67/025
USPC ....................................... 358/1.15
See application file for complete search history.

(56) References Cited

U.S. PATENT DOCUMENTS

| | | | | |
|---|---|---|---|---|
| 9,807,084 B2 * | 10/2017 | Sugano | ............... | H04L 63/0823 |
| 2004/0117494 A1 * | 6/2004 | Mitchell | ................ | H04L 67/36 |
| | | | | 709/230 |
| 2006/0015587 A1 * | 1/2006 | Bose | ................... | H04L 41/0213 |
| | | | | 709/220 |
| 2006/0282545 A1 * | 12/2006 | Arwe | ........................ | G06F 8/71 |
| | | | | 709/237 |
| 2013/0227272 A1 * | 8/2013 | Cox | ...................... | H04L 63/205 |
| | | | | 713/151 |
| 2014/0337614 A1 * | 11/2014 | Kelson | .................. | H04L 63/168 |
| | | | | 713/152 |
| 2014/0337926 A1 * | 11/2014 | Shannon | ............... | H04L 63/102 |
| | | | | 726/4 |

(Continued)

FOREIGN PATENT DOCUMENTS

JP 2016-029787 A 3/2016

*Primary Examiner* — Gabriel I Garcia
(74) *Attorney, Agent, or Firm* — CANON U.S.A., INC. IP Division

(57) ABSTRACT

When a version of an encryption communication protocol that is used for communication and set as an apparatus main unit setting for a communication apparatus is changed, a notification indicating such change of the setting is sent to an application installed in the communication apparatus.

20 Claims, 9 Drawing Sheets

(56) References Cited

U.S. PATENT DOCUMENTS

2015/0271065 A1\* 9/2015 May .................... H04L 49/1507
370/401
2017/0070632 A1\* 3/2017 Horino ............... H04N 1/00973

\* cited by examiner

300 SETTING SCREEN

310 SETTING SCREEN

320 SETTING SCREEN

330 SETTING SCREEN

400 SETTING SCREEN

410 SETTING SCREEN

600 SETTING SCREEN

610 SETTING SCREEN

620 SETTING SCREEN

COMMUNICATION APPARATUS, CONTROL METHOD FOR COMMUNICATION APPARATUS, AND STORAGE MEDIUM FOR CHANGING A VERSION OF AN ENCRYPTION COMMUNICATION PROTOCOL USED FOR COMMUNICATION

BACKGROUND OF THE INVENTION

Field of the Invention

The aspect of the embodiments relates to a communication apparatus, a control method for a communication apparatus, and a storage medium.

Description of the Related Art

A communication apparatus, such as a personal computer (PC) or a printing apparatus, has an encryption communication function. The communication apparatus performs communication using the encryption communication function, which reduces the risk of leakage of confidential information on a network. As encryption communication protocols, Secure Sockets Layer (SSL) and Transport Layer Security (TLS) are widely used.

These encryption communication protocols include a plurality of protocol versions. In the TLS, for example, TLS1.0, TLS1.1, and TLS1.2 are standardized by RFC2246, RFC4346, and RFC5246, respectively. In the communication apparatus, a user selects a version to be used from among the versions TLS1.0, TLS1.1, and TLS1.2, and sets the selected version as an apparatus main unit setting for the communication apparatus. Japanese Patent Laid-Open No. 2016-029787 discloses a configuration in which when a setting "inhibit use of the weak cipher" is set in a printing apparatus, use of TLS is permitted and use of SSL is inhibited.

SUMMARY OF THE INVENTION

According to an aspect of the embodiments, a communication apparatus includes a memory device that stores a set of instructions, and at least one processor that executes the set of instructions to change, according to a user instruction, a version of an encryption communication protocol that is used for communication and set as an apparatus main unit setting for the communication apparatus, and reflect a change of the version of the encryption communication protocol according to the user instruction in an application setting for an application installed in the communication apparatus.

Further features of the disclosure will become apparent from the following description of exemplary embodiments with reference to the attached drawings.

DESCRIPTION OF THE EMBODIMENTS

Modes for carrying out the disclosure will be described below with reference to the drawings. The following exemplary embodiments are not intended to limit the disclosure according to the claims, and not all combinations of features described in the exemplary embodiments are indispensable for solving means of the disclosure.

Figure 1:
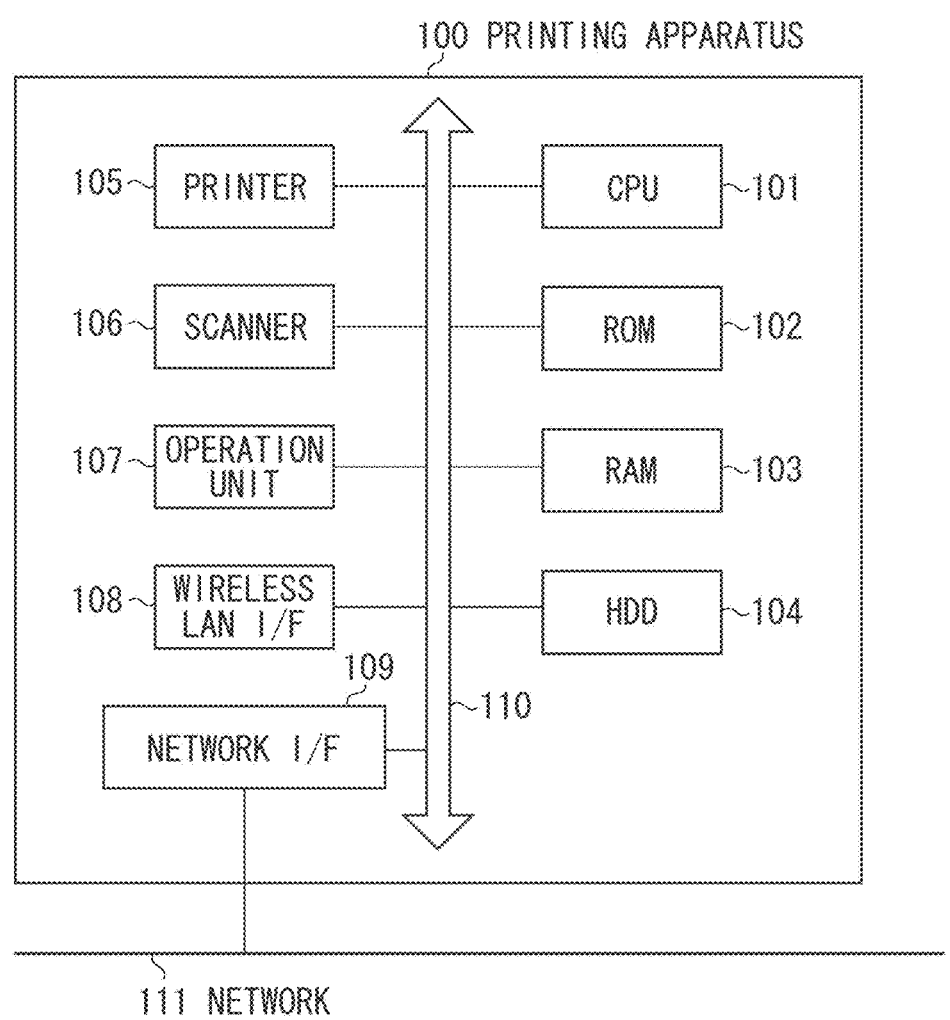
FIG. 1 is a diagram illustrating a hardware configuration of a printing apparatus.

First, a hardware configuration of a printing apparatus 100 will be described with reference to FIG. 1. A central processing unit (CPU) 101 reads out a control program stored in a read only memory (ROM) 102, and executes various processes for controlling an operation of the printing apparatus 100. The ROM 102 stores the control program. A random access memory (RAM) 103 is used as a temporary storage area, such as a main memory or a work area, for the CPU 101. A hard disk drive (HDD) 104 is a nonvolatile storage medium for storing various data. An extension application for extending functions can be installed in the printing apparatus 100, and an application program for the extension application installed in the printing apparatus 100 is stored in the HDD 104.

The printing apparatus 100 according to the present exemplary embodiment has a configuration in which the single CPU 101 executes each process illustrated in a flowchart described below, but instead may have other embodiments. For example, a plurality of CPUs may cooperate to execute each process illustrated in the flowchart described below. Some of the processes illustrated in the flowchart described below may be executed using a hardware circuit such as an application specific integrated circuit (ASIC).

A printer 105 executes print processing on a sheet based on print data received by a wireless local area network (LAN) interface (I/F) 108 or a network I/F 109. A scanner 106 reads an original document placed by a user, and generates an original document image. The original document image generated by the scanner 106 is printed by the printer 105 (copy process), or is stored in the HDD 104.

An operation unit 107 includes a display having a touch panel function, and various hardware keys. Various operation screens are displayed on the display of the operation unit 107. The user can input an instruction or information to the printing apparatus 100 through the operation unit 107.

The wireless LAN I/F 108 executes wireless LAN communication such as IEEE802.11a/b/g/n/ac. The network I/F 109 is connected to a network 111 through a LAN cable, and communicates with an external apparatus (e.g., a PC) on the network 111. An encryption communication protocol, such as TLS, is applied to the communication executed by the wireless LAN I/F 108 and the network I/F 109.

The units, such as the CPU 101, the ROM 102, and the RAM 103, which are described above, are each connected to a bus 110. Control signals from the CPU 101 and data signals are transmitted and received between the units.

Figure 2:
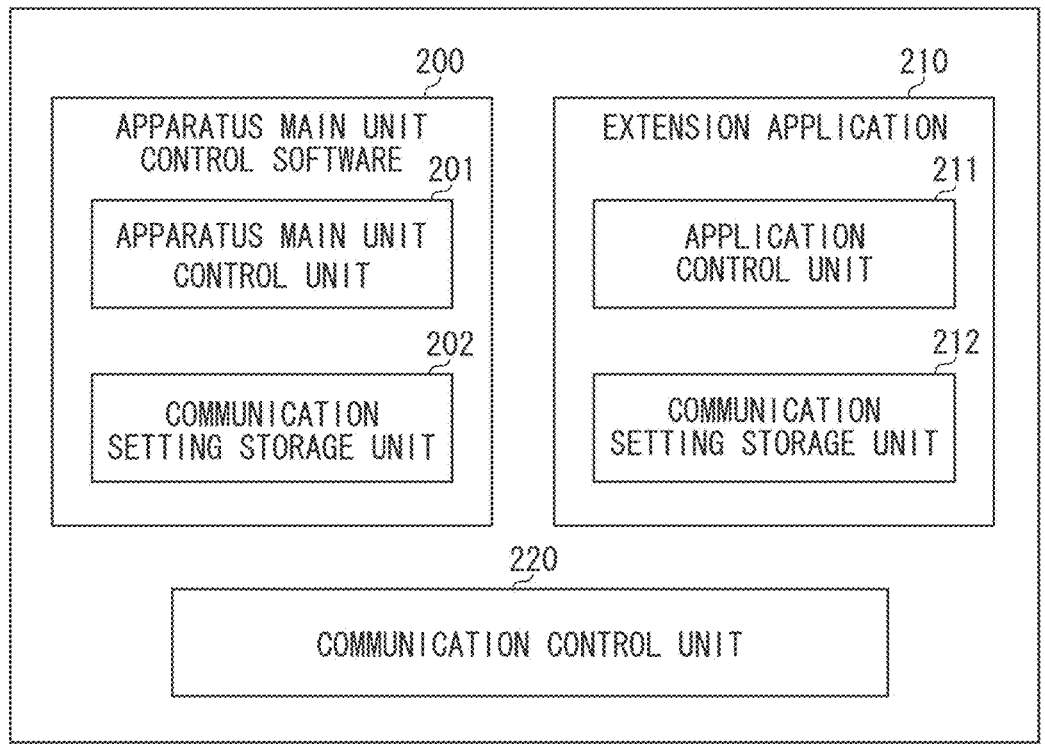
FIG. 2 is a diagram illustrating a software configuration of the printing apparatus.

Next, a software configuration of the printing apparatus 100 will be described with reference to FIG. 2.

An apparatus main unit control software 200 is a functional block implemented in such a manner that the CPU 101 executes the control program stored in the ROM 102. The apparatus main unit control software 200 is basic software for controlling an operation of the printing apparatus 100. An apparatus main unit control unit 201 performs various processes such as display of screens on the operation unit 107, interpretation of a user instruction input through the operation unit 107, and communication processing using a communication control unit 220. A communication setting storage unit 202 stores various communication settings such as a TLS version setting on each setting screen described below.

The communication control unit 220 is a functional block implemented in such a manner that the CPU 101 executes the control program stored in the ROM 102. The communication control unit 220 controls the communication using the wireless LAN I/F 108 and the network I/F 109 based on an instruction received from the apparatus main unit control software 200 or an extension application 210.

An extension application can be installed in the printing apparatus 100 so as to extend functions of the printing apparatus 100. An application program of the installed extension application is stored in the HDD 104. The extension application 210 is a functional block implemented in such a manner that the CPU 101 executes the control program stored in the HDD 104. The extension application 210 is, for example, an application that provides a Web browser function. An application control unit 211 performs various processes such as display of screens on the operation unit 107, interpretation of a user instruction input through the operation unit 107, and communication processing using the communication control unit 220. A communication setting storage unit 212 stores various communication settings such as a TLS version setting on each setting screen described below. FIG. 2 illustrates an example in which a single extension application is installed in the printing apparatus 100. However, a plurality of extension applications can be installed in the printing apparatus 100. When a plurality of extension applications is installed in the printing apparatus 100, the number of functional blocks for the extension applications is increased by an amount equal to the number of installed extension applications.

As described above with reference to FIG. 2, the printing apparatus 100 has a configuration in which the apparatus main unit control software 200 and the extension application 210 store communication settings separately. Accordingly, the present exemplary embodiment has a feature that, when the communication setting (e.g., TLS version setting) stored in the apparatus main unit control software 200 is changed by the user, such change of the communication setting is also reflected in the communication setting stored in the extension application. The operation procedure to be carried out when the user changes the TLS version setting stored in the apparatus main unit control software 200 and the process of reflecting the change of the TLS version setting in the extension application will be described with reference to FIGS. 3A, 3B, 3C, and 3D, FIGS. 4A and 4B, and FIG. 5.

Figure 3A:
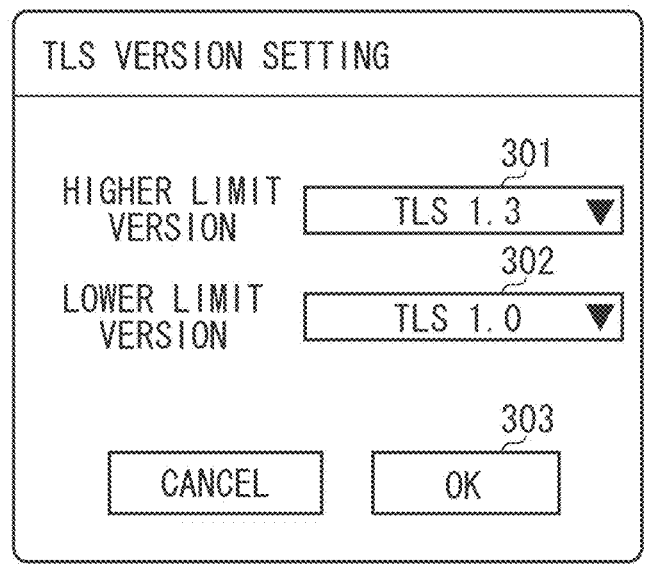
FIGS. 3A, 3B, 3C, and 3D are diagrams each illustrating a setting screen for setting an apparatus main unit setting.

A setting screen 300 illustrated in FIG. 3A is a screen for the user to change the TLS version setting stored as an apparatus main unit setting in the apparatus main unit control software 200, and is displayed on the operation unit 107 according to an instruction from the apparatus main unit control unit 201. In the TLS, TLS1.0, TLS1.1, and TLS1.2 are standardized by RFC2246, RFC4346, and RFC5246, respectively. In addition, TLS1.3 is being developed as a new standard. The user selects a higher limit version and a lower limit version from among the four versions of TLS1.0 to TLS1.3 by using a setting object 301 and a setting object 302 on the setting screen 300. The user selects a desired TLS version in consideration of communication environments, such as a PC that communicates with the printing apparatus 100, and TLS versions supported by the external apparatus.

For example, when TLS1.3 is set as the higher limit version and TLS1.1 is set as the lower limit version, the apparatus main unit control software 200 recognizes that TLS1.1, TLS1.2, and TLS1.3 are available TLS versions and TLS1.0 cannot be used. For example, when TLS1.2 is set as both the higher limit version and the lower limit version, the apparatus main unit control software 200 recognizes that TLS1.2 can be used and the TLSs of the other versions cannot be used.

Figure 3B:
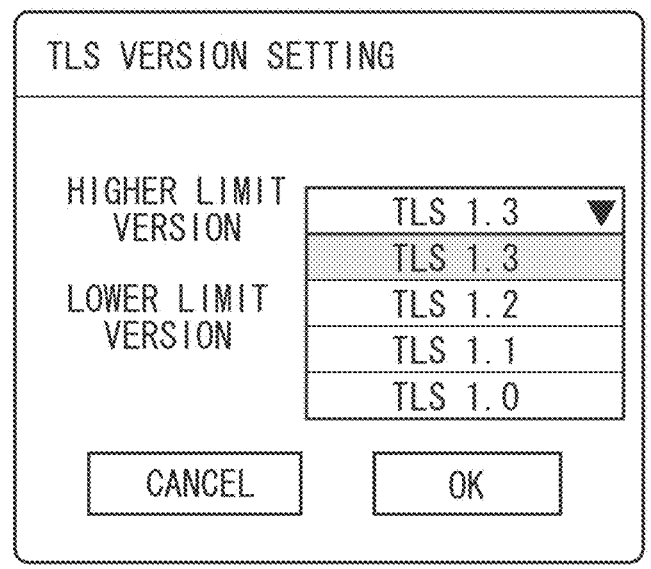
Figure 3C:
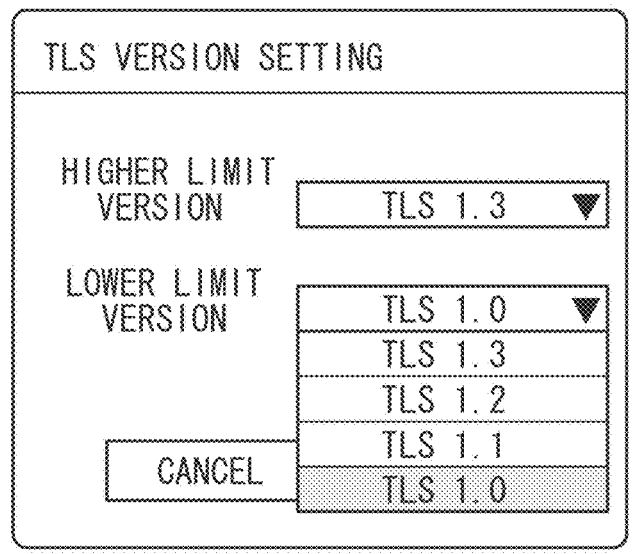

When the user selects the setting object 301 on the setting screen 300 (the setting screen is pressed by a touch operation in the present exemplary embodiment), the apparatus main unit control unit 201 displays a setting screen 310 illustrated in FIG. 3B on the operation unit 107. On the setting screen 310, four versions of TLS1.0 to TLS1.3 are displayed, and the user can select a desired version as the higher limit version. When the user selects the setting object 302 on the setting screen 300, the apparatus main unit control unit 201 displays a setting screen 320 illustrated in FIG. 3C on the operation unit 107. On the setting screen 320, four versions of TLS1.0 to TLS1.3 are displayed, and the user can select a desired version as the lower limit version.

When the user selects an OK button 303 on the setting screen 300, the apparatus main unit control unit 201 determines whether a combination of the higher limit version and the lower limit version is appropriate. In the present exemplary embodiment, in a case where the higher limit version is higher than the lower limit version, or in a case where the higher limit version is equal to the lower limit version, the apparatus main unit control unit 201 determines that the combination of the higher limit version and the lower limit version is appropriate. When it is determined that the combination of the higher limit version and the lower limit version is appropriate, the apparatus main unit control unit 201 displays a setting screen 330 illustrated in FIG. 3D on the operation unit 107, and the communication setting storage unit 202 of the apparatus main unit control software 200 stores the changed TLS version setting. Further, the apparatus main unit control unit 201 notifies the extension application 210 of the changed TLS version setting, and the communication setting storage unit 212 of the extension application 210 stores the notified TLS version setting. The setting screen 330 is a notification screen for notifying the user that the change of the TLS version setting has completed.

Figure 4A:
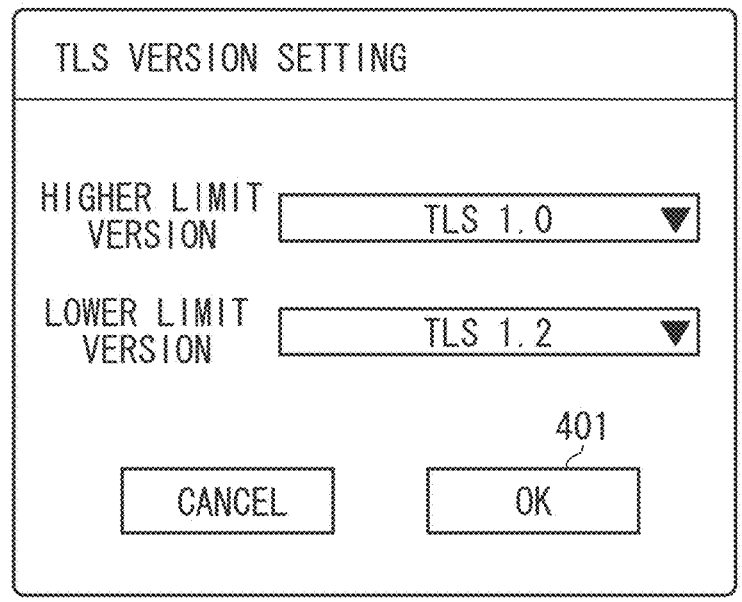
FIGS. 4A and 4B are diagrams each illustrating a setting screen for setting the apparatus main unit setting.
Figure 4B:
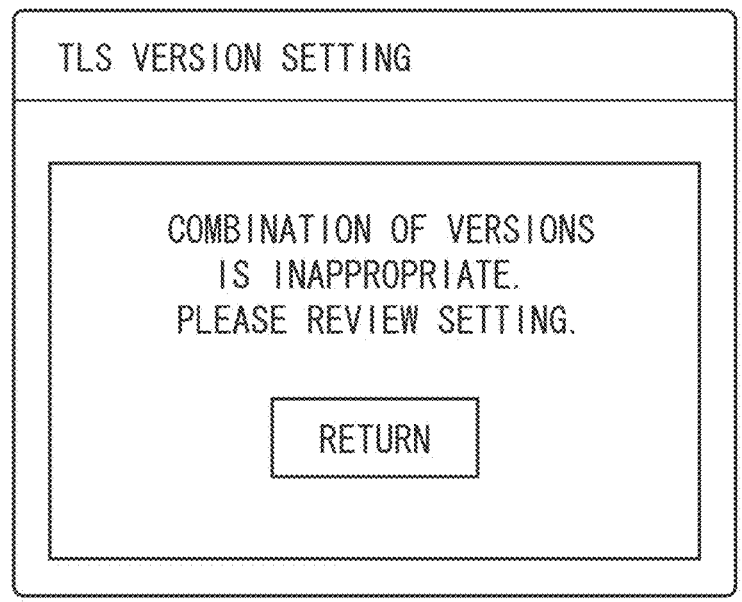

On the other hand, in a case where the higher limit version is lower than the lower limit version, the apparatus main unit control unit 201 determines that the combination of the higher limit version and the lower limit version is inappropriate. A setting screen 400 illustrated in FIG. 4A illustrates an example in which the combination of the higher limit version and the lower limit version is inappropriate. On the setting screen 400, TLS1.0 is selected as the higher limit version and TLS1.2 is selected as the lower limit version, and thus the higher limit version is lower than the lower limit version. If the user selects an OK button 401 in this state, the apparatus main unit control unit 201 displays a setting screen 410 illustrated in FIG. 4B on the operation unit 107, and prompts the user to set another TLS version setting again. The setting screen 410 is a notification screen for notifying the user that the change of the TLS version setting has failed.

Processing executed by the apparatus main unit control software 200 will be described with reference to the flowchart of FIG. 5. Each step illustrated in the flowchart of FIG.

5 is processed in such a manner that the CPU 101 develops the control program, which is stored in the ROM 102, in the RAM 103 and executes the control program. The printing apparatus 100 may have a configuration in which the CPU 101 is caused to execute at least some of the steps in the flowchart of FIG. 5 and another CPU (not illustrated) which is different from the CPU 101 is caused to execute the rest of the steps.

Figure 5:
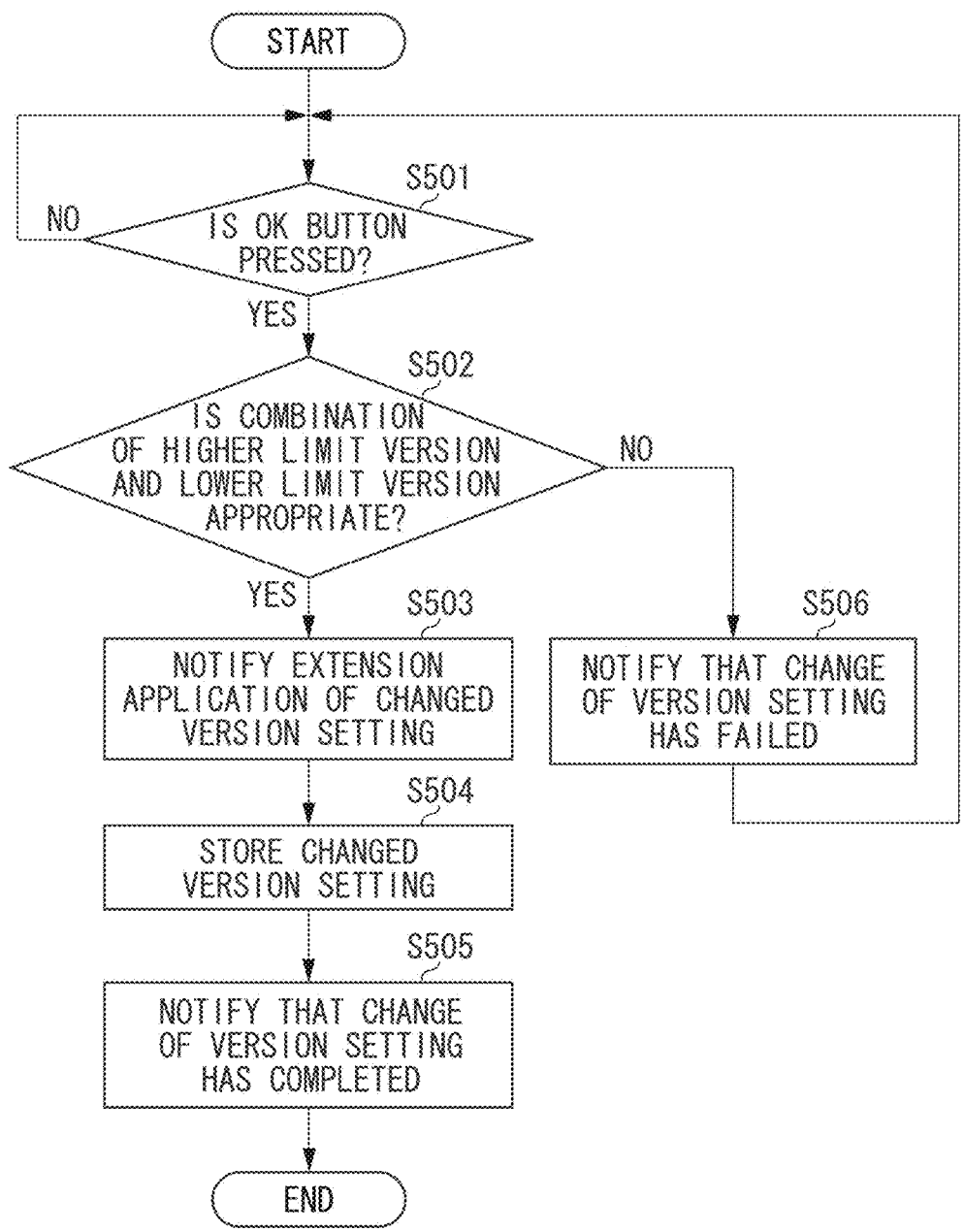
FIG. 5 is a flowchart illustrating processing executed by the printing apparatus.

When the apparatus main unit control unit 201 of the apparatus main unit control software 200 displays the TLS version setting screen (e.g., the setting screen 300) according to a user instruction, the processing illustrated in the flowchart of FIG. 5 starts. As described above with reference to FIGS. 3A, 3B, 3C, and 3D, the user selects a desired TLS version by using the setting object 301 and the setting object 302. In step S501, the apparatus main unit control unit 201 determines whether the OK button 303 is pressed. In a case where the OK button 303 is pressed by the user (YES in step S501), the processing proceeds to step S502. In a case where the OK button 303 is not pressed by the user (NO in step S501), the apparatus main unit control unit 201 remains in a standby state until the user presses the OK button 303.

Step S502 will be described. In step S502, the apparatus main unit control unit 201 determines whether the combination of the TLS higher limit version and the TLS lower limit version selected by the user is appropriate. In the present exemplary embodiment, in a case where the higher limit version is higher than the lower limit version, or in a case where the higher limit version is equal to the lower limit version, the apparatus main unit control unit 201 determines that the combination of the higher limit version and the lower limit version is appropriate (YES in step S502), and the processing proceeds to step S503. On the other hand, in a case where the higher limit version is lower than the lower limit version, the apparatus main unit control unit 201 determines that the combination of the higher limit version and the lower limit version is inappropriate (NO in step S502), and the processing proceeds to step S506.

Step S503 will be described. In step S503, the apparatus main unit control unit 201 notifies the extension application 210 of the changed TLS version setting. For example, in a case where TLS1.3 is set as the higher limit version and TLS1.1 is set as the lower limit version, the apparatus main unit control unit 201 notifies the extension application 210 of TLS1.1, TLS1.2, and TLS1.3 as available TLS versions. In a case where TLS1.2 is selected as both the higher limit version and the lower limit version, the apparatus main unit control unit 201 notifies the extension application 210 of TLS1.2 as an available TLS version.

The communication setting storage unit 212 of the extension application 210 that has received the notification stores the changed TLS version setting (the notified TLS version setting) as a TLS version that can be used by the extension application 210. By the process of step S503, the TLS version stored in the communication setting storage unit 212 is applied to the communication to be subsequently executed by the extension application 210.

In step S504, the communication setting storage unit 202 of the apparatus main unit control software 200 stores the changed TLS version setting. By the process of step S504, the TLS version stored in the communication setting storage unit 202 is applied to the communication to be subsequently executed by the apparatus main unit control software 200.

Figure 3D:
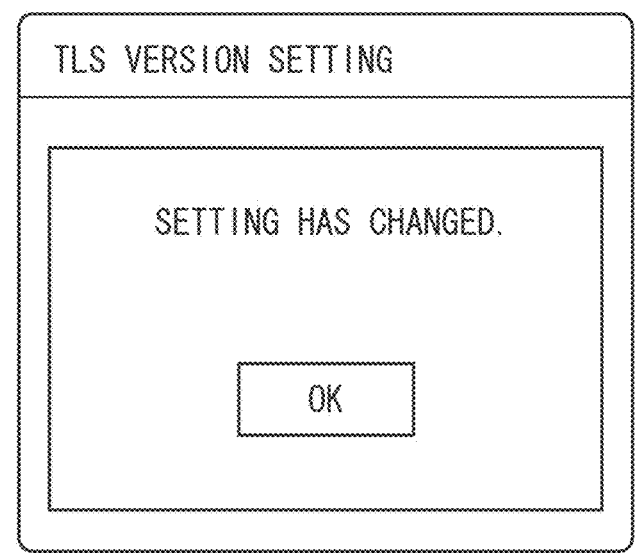

In step S505, the apparatus main unit control unit 201 of the apparatus main unit control software 200 displays the setting screen 330 illustrated in FIG. 3D on the display of the operation unit 107, thereby notifying the user that the change of the TLS version setting has completed.

Step S506 will be described. In step S506, the apparatus main unit control unit 201 displays the setting screen 410 illustrated in FIG. 4B on the display of the operation unit 107, thereby notifying that the change of the TLS version setting has failed. Then, the processing returns to step S501.

By the process of step S503, when the TLS version setting stored as the apparatus main unit setting by the apparatus main unit control software 200 is changed by the user, such change of the setting can also be reflected in the application setting for the extension application 210.

Figure 6A:
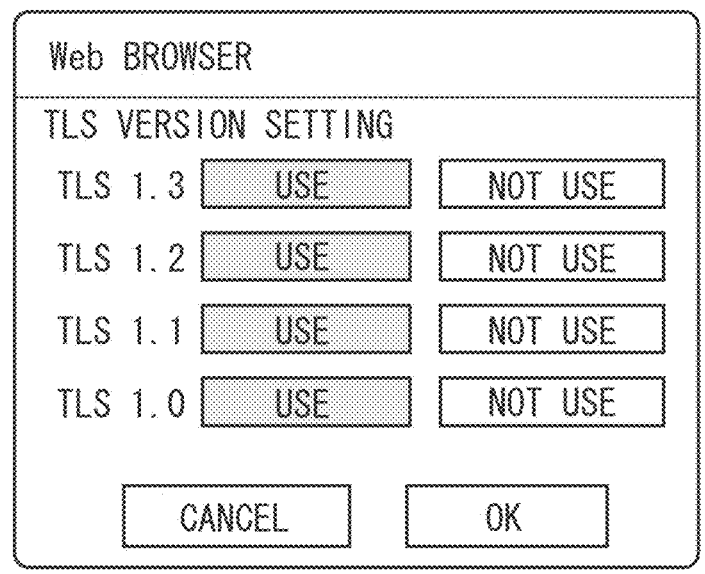
FIGS. 6A, 6B, and 6C are diagrams each illustrating a setting screen for setting an application setting.

The extension application 210 displays a TLS version setting screen as an application setting for the extension application 210, separately from the TLS version setting screen displayed by the apparatus main unit control software 200. A setting screen 600 illustrated in FIG. 6A is an example of a TLS version screen that is displayed on the display of the operation unit 107 by the application control unit 211 of the extension application 210. When the communication setting storage unit 212 of the extension application 210 stores four versions of TLS1.0 to TLS1.3 as available TLS versions, the setting screen 600 is displayed. The user can select a TLS version to be applied to the communication executed by the extension application 210 from among the four versions of TLS1.0 to TLS1.3.

Figure 6B:
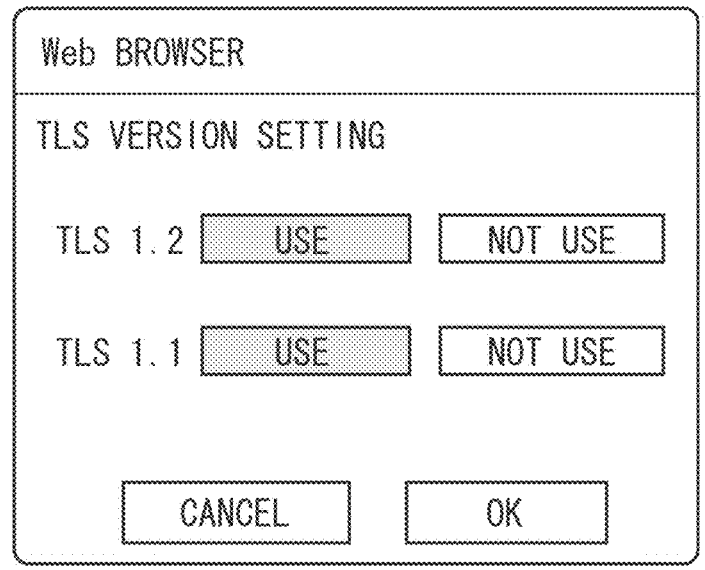

Further, in the present exemplary embodiment, when the TLS version setting stored as the apparatus main unit setting by the apparatus main unit control software 200 is changed, such change of the setting is also reflected in the extension application 210 by the process of step S503 illustrated in FIG. 5. For example, assume that the setting of available TLS versions is changed to TLS1.1 and TLS1.2 by the process of the flowchart illustrated in FIG. 5. In this case, the TLS version setting screen displayed on the operation unit 107 by the application control unit 211 of the extension application 210 is a setting screen 610 illustrated in FIG. 6B. Unlike the setting screen 600, the setting screen 610 has a configuration in which TLS1.0 and TLS1.3 cannot be selected as TLS versions to be applied to the communication executed by the extension application 210. Thus, according to the present exemplary embodiment, the change of the TLS version setting stored as the apparatus main unit setting by the apparatus main unit control software 200 can also be reflected on the TLS version setting screen provided by the extension application 210.

Figure 7:
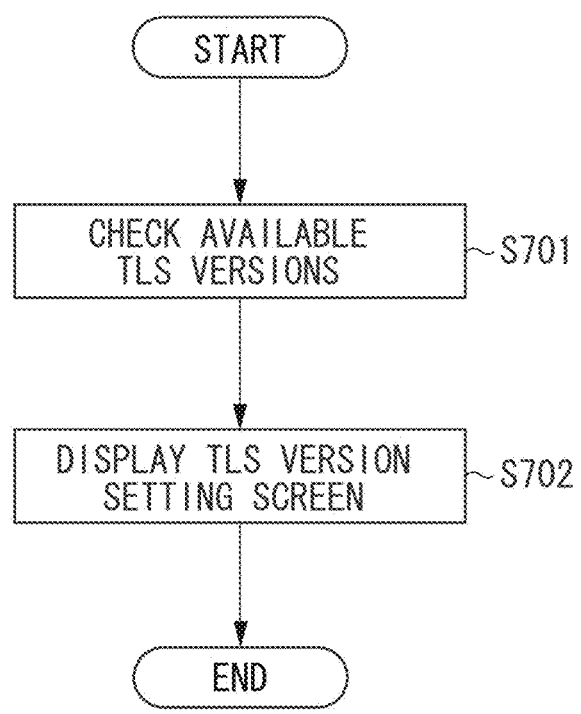
FIG. 7 is a flowchart illustrating processing executed when a setting screen for setting the application setting is displayed.

Processing executed when the TLS version setting screen is displayed by the extension application 210 will be described with reference to the flowchart of FIG. 7. Each step illustrated in the flowchart of FIG. 7 is processed in such a manner that the CPU 101 develops the application program stored in the HDD 104 and executes the application program. The printing apparatus 100 may have a configuration in which the CPU 101 is caused to execute at least some of the steps in the flowchart of FIG. 7 and another CPU (not illustrated) which is different from the CPU 101 is caused to execute the rest of the steps.

When the extension application 210 receives, from the user, an instruction to display the TLS version setting screen, the processing illustrated in the flowchart of FIG. 7 starts. In step S701, the application control unit 211 of the extension application 210 checks available TLS versions by referring to information stored in the communication setting storage unit 212 of the extension application 210.

Figure 6C:
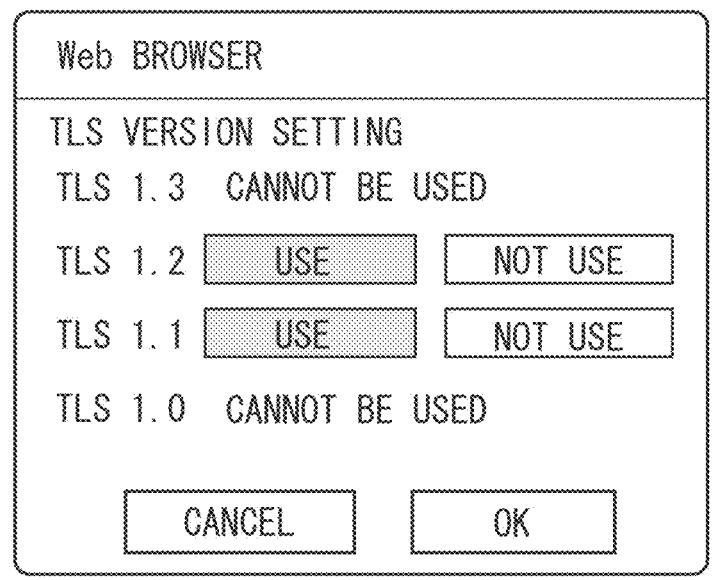

In step S702, the application control unit 211 displays the TLS version setting screen on the display of the operation unit 107 based on a result of checking in step S701. For example, in a case where the communication setting storage unit 212 stores four versions of TLS1.0 to TLS1.3 as available TLS versions, the application control unit 211 displays the setting screen 600 illustrated in FIG. 6A. In a case where the communication setting storage unit 212 stores TLS1.1 and TLS1.2 as available TLS versions, the application control unit 211 displays the setting screen 610 illustrated in FIG. 6B. On the setting screen 610 illustrated in FIG. 6B, TLS1.0 and TLS1.3, which are set not to be used in the apparatus main unit setting, are not displayed as selection candidates. Note that a setting screen 620 illustrated in FIG. 6C may be displayed instead of the setting screen 610 illustrated in FIG. 6B. Although TLS1.0 and TLS1.3 are displayed on the setting screen 620 illustrated in FIG. 6C, the user cannot select TLS1.0 and TLS1.3 as TLS versions to be applied to the communication executed by the extension application 210.

As described above, the TLS versions that are set not to be used in the apparatus main unit setting are not displayed on the TLS version setting screen displayed by the extension application 210. Thus, the TLS versions that are set not to be used in the apparatus main unit setting can be prevented from being set as TLS versions to be applied to the communication executed by the extension application 210.

In the exemplary embodiments described above, the printing apparatus 100 is illustrated by way of example. However, the aspect of the embodiments is also applicable to other types of communication apparatuses such as a PC, a smartphone, and a digital camera.

Further, in the exemplary embodiments described above, TLS is described by way of example. However, the aspect of the embodiments is also applicable to other encryption communication protocols such as SSL.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2016-198894, filed Oct. 7, 2016, which is hereby incorporated by reference herein in its entirety.

What is claimed is:

1. A communication apparatus comprising:
a memory device that stores a set of instructions; and
at least one processor that executes the set of instructions to:
provide an apparatus main unit setting screen that is a screen for making settings for the communication apparatus and for setting two limit values, which are upper and lower limits, for an encryption communication protocol used for encrypted communication;
store the upper limit and the lower limit of the encryption communication protocol that have been set via the apparatus main unit setting screen, wherein the encryption communication protocol used for encrypted communication is limited on a basis of the stored upper limit and the stored lower limit; and
reflect a limitation on the encryption communication protocol used for encrypted communication based on the stored upper limit and the stored lower limit into an application encryption communication protocol setting for an application installed in the communication apparatus.

2. The communication apparatus according to claim 1, wherein the at least one processor executes the set of instructions in the memory device to:
store, in a storage unit, a version of the encryption communication protocol used for communication as the apparatus main unit setting; and
store, in the storage unit, a version of the encryption communication protocol used for communication as the application encryption communication protocol setting.

3. The communication apparatus according to claim 2, further comprising a display unit configured to display a screen for a user to select a version of the encryption communication protocol used for communication of the application based on information indicating the version of the encryption communication protocol that is used for communication and stored in the storage unit,
wherein, on the screen, a version of the encryption communication protocol that is set not to be used for communication as the apparatus main unit setting cannot be selected by the user.

4. The communication apparatus according to claim 3, wherein, on the screen, a version of the encryption communication protocol that is set not to be used for communication as the apparatus main unit setting is not displayed as a selection candidate.

5. The communication apparatus according to claim 1, wherein the encryption communication protocol is TLS, and
wherein the version of the encryption communication protocol includes at least TLS1.0, TLS1.1, and TLS1.3.

6. The communication apparatus according to claim 1, wherein the communication apparatus is a printing apparatus configured to execute printing on a sheet.

7. The communication apparatus according to claim 1, wherein the at least one processor executes the set of instructions in the memory device to:

set, according to the user instruction, a higher limit and a lower limit of the version of the encryption communication protocol used for communication.

8. A control method for a communication apparatus, comprising:
    providing an apparatus main unit setting screen that is a screen for making settings for the communication apparatus and for setting two limit values, which are upper and lower limits, for an encryption communication protocol used for encrypted communication;
    storing the upper limit and the lower limit of the encryption communication protocol that have been set via the apparatus main unit setting screen, wherein the encryption communication protocol used for encrypted communication is limited on a basis of the stored upper limit and the stored lower limit; and
    reflecting a limitation on the encryption communication protocol used for encrypted communication based on the stored upper limit and the stored lower limit into an application encryption communication protocol setting for an application installed in the communication apparatus.

9. The control method according to claim 8, further comprising:
    storing, in a storage unit, a version of the encryption communication protocol used for communication as the apparatus main unit setting; and
    storing, in the storage unit, a version of the encryption communication protocol used for communication as the application encryption communication protocol setting.

10. The control method according to claim 9, further comprising displaying a screen for a user to select a version of the encryption communication protocol used for communication of the application based on information indicating the version of the encryption communication protocol that is used for communication and stored in the storage unit,
    wherein, on the screen, a version of the encryption communication protocol that is set not to be used for communication as the apparatus main unit setting cannot be selected by the user.

11. The control method according to claim 10, wherein, on the screen, a version of the encryption communication protocol that is set not to be used for communication as the apparatus main unit setting is not displayed as a selection candidate.

12. The control method according to claim 8,
    wherein the encryption communication protocol is TLS, and
    wherein the version of the encryption communication protocol includes at least TLS1.0, TLS1.1, and TLS1.3.

13. The control method according to claim 8, wherein the communication apparatus is a printing apparatus configured to execute printing on a sheet.

14. The control method according to claim 8, further comprising:
    setting, according to the user instruction, a higher limit and a lower limit of the version of the encryption communication protocol used for communication.

15. A non-transitory computer readable storage medium storing a program for causing a computer to execute a method for a communication apparatus, the method comprising:
    providing an apparatus main unit setting screen that is a screen for making settings for the communication apparatus and for setting two limit values, which are upper and lower limits, for an encryption communication protocol used for encrypted communication;
    storing the upper limit and the lower limit of the encryption communication protocol that have been set via the apparatus main unit setting screen, wherein the encryption communication protocol used for encrypted communication is limited on a basis of the stored upper limit and the stored lower limit; and
    reflecting a limitation on the encryption communication protocol used for encrypted communication based on the stored upper limit and the stored lower limit into encryption communication protocol an application setting for an application installed in the communication apparatus.

16. The non-transitory computer readable storage medium according to claim 15, further comprising:
    storing, in a storage unit, a version of the encryption communication protocol used for communication as the apparatus main unit setting; and
    storing, in the storage unit, a version of the encryption communication protocol used for communication as the application encryption communication protocol setting.

17. The non-transitory computer readable storage medium according to claim 16, further comprising displaying a screen for a user to select a version of the encryption communication protocol used for communication of the application based on information indicating the version of the encryption communication protocol that is used for communication and stored in the storage unit,
    wherein, on the screen, a version of the encryption communication protocol that is set not to be used for communication as the apparatus main unit setting cannot be selected by the user.

18. The non-transitory computer readable storage medium according to claim 15,
    wherein the encryption communication protocol is TLS, and
    wherein the version of the encryption communication protocol includes at least TLS1.0, TLS1.1, and TLS1.3.

19. The non-transitory computer readable storage medium according to claim 15, wherein the communication apparatus is a printing apparatus configured to execute printing on a sheet.

20. The non-transitory computer readable storage medium according to claim 15, further comprising:
    setting, according to the user instruction, a higher limit and a lower limit of the version of the encryption communication protocol used for communication.

* * * * *